(12) United States Patent
Fry

(10) Patent No.: US 12,608,969 B2
(45) Date of Patent: Apr. 21, 2026

(54) SYSTEMS AND METHODS FOR NOSE-BASED PET IDENTIFICATION

(71) Applicant: Mars, Incorporated, McLean, VA (US)

(72) Inventor: Alexander Fry, Whitchurch (GB)

(73) Assignee: Mars, Incorporated, McLean, VA (US)

( * ) Notice: Subject to any disclaimer, the term of this patent is extended or adjusted under 35 U.S.C. 154(b) by 298 days.

(21) Appl. No.: 18/257,396

(22) PCT Filed: Dec. 13, 2021

(86) PCT No.: PCT/US2021/072887
§ 371 (c)(1),
(2) Date: Jun. 14, 2023

(87) PCT Pub. No.: WO2022/133422
PCT Pub. Date: Jun. 23, 2022

(65) Prior Publication Data
US 2024/0104952 A1 Mar. 28, 2024

Related U.S. Application Data

(60) Provisional application No. 63/125,929, filed on Dec. 15, 2020.

(51) Int. Cl.
*G06V 40/10* (2022.01)
*G06V 10/24* (2022.01)
(Continued)

(52) U.S. Cl.
CPC .............. *G06V 40/10* (2022.01); *G06V 10/24* (2022.01); *G06V 10/28* (2022.01); *G06V 10/70* (2022.01); *G06V 10/993* (2022.01)

(58) Field of Classification Search
None
See application file for complete search history.

(56) References Cited

U.S. PATENT DOCUMENTS

D546,337 S 7/2007 Wood et al.
D588,151 S 3/2009 Okada
(Continued)

FOREIGN PATENT DOCUMENTS

CN 303841536 A 9/2016
CN 109543663 A * 3/2019 ........... G06F 18/214
(Continued)

OTHER PUBLICATIONS

"How to Activate Your Replacement Whistle Tracker" located at https://www.youtube.com/watch?v=xef2Sh_7r50; visited on May 30, 2023. (1 page).
(Continued)

*Primary Examiner* — Amandeep Saini
*Assistant Examiner* — Caroline Tabancay Duffy
(74) *Attorney, Agent, or Firm* — Bookoff McAndrews, PLLC

(57) ABSTRACT

A method for identifying a pet via an image of a nose of the pet includes receiving at least one image comprising the nose of the pet, identifying the nose of the pet and nostrils of the nose in the at least one image, comparing a degree of alignment of the nostrils of the nose with a first threshold value, in accordance with the degree of alignment of the nostrils meeting the threshold value, determining a quality metric ofr at least a nose portion of the image, and in accordance with the quality meeting a second threshold value, determining a representation of features of the nose of the pet in the at last one image.

17 Claims, 9 Drawing Sheets

(51) Int. Cl.

| | |
|---|---|
| *G06V 10/28* | (2022.01) |
| *G06V 10/70* | (2022.01) |
| *G06V 10/98* | (2022.01) |

(56) References Cited

U.S. PATENT DOCUMENTS

| | | | |
|---|---|---|---|
| 8,605,094 | B1 | 12/2013 | Alfaro et al. |
| D720,361 | S | 12/2014 | Mitchell et al. |
| D723,061 | S | 2/2015 | Qin |
| D729,834 | S | 5/2015 | Rezende et al. |
| D740,850 | S | 10/2015 | Zhang et al. |
| D740,855 | S | 10/2015 | Lee et al. |
| D741,896 | S | 10/2015 | Park et al. |
| D757,110 | S | 5/2016 | Kang |
| D758,441 | S | 6/2016 | Yang et al. |
| D759,689 | S | 6/2016 | Olson et al. |
| D760,252 | S | 6/2016 | Engstrand et al. |
| D760,256 | S | 6/2016 | Olson et al. |
| D761,268 | S | 7/2016 | Oh et al. |
| D766,982 | S | 9/2016 | Forslund et al. |
| D768,149 | S | 10/2016 | Engstrand et al. |
| D773,529 | S | 12/2016 | Cabrera, Jr. et al. |
| D773,534 | S | 12/2016 | Yuk et al. |
| D776,147 | S | 1/2017 | Simmons et al. |
| D780,206 | S | 2/2017 | Volovik |
| D780,806 | S | 3/2017 | Forsblom |
| D789,391 | S | 6/2017 | Cabrera, Jr. et al. |
| D799,517 | S | 10/2017 | Lim |
| D803,239 | S | 11/2017 | Yuk et al. |
| D806,092 | S | 12/2017 | Hersh et al. |
| D810,773 | S | 2/2018 | Volovik |
| D819,068 | S | 5/2018 | Scheel et al. |
| D819,683 | S | 6/2018 | Zhang et al. |
| D820,861 | S | 6/2018 | Ng et al. |
| D829,759 | S | 10/2018 | Clapper et al. |
| D830,376 | S | 10/2018 | Naghdy et al. |
| 10,120,529 | B2 | 11/2018 | Felt |
| D839,303 | S | 1/2019 | Jung et al. |
| D847,159 | S | 4/2019 | Cabrera, Jr. et al. |
| 10,275,677 | B2 | 4/2019 | Yoshida |
| D847,829 | S | 5/2019 | Kim et al. |
| D849,754 | S | 5/2019 | Thompson et al. |
| D863,322 | S | 10/2019 | Freilafert et al. |
| 10,482,317 | B2 * | 11/2019 | McVey ............... G06V 40/171 |
| 10,565,440 | B2 | 2/2020 | Wee et al. |
| D879,803 | S | 3/2020 | Corona et al. |
| D879,804 | S | 3/2020 | Corona et al. |
| D880,512 | S | 4/2020 | Greenwald et al. |
| D889,492 | S | 7/2020 | Luchner et al. |
| D895,649 | S | 9/2020 | Jetly et al. |
| D900,845 | S | 11/2020 | Tomori |
| D901,538 | S | 11/2020 | Cabrera, Jr. et al. |
| D912,072 | S | 3/2021 | Liu et al. |
| D916,719 | S | 4/2021 | Naghdy et al. |
| D918,952 | S | 5/2021 | Pei |
| D919,638 | S | 5/2021 | Marsolek et al. |
| D921,698 | S | 6/2021 | Devine et al. |
| D923,650 | S | 6/2021 | Kim et al. |
| D924,904 | S | 7/2021 | Cho et al. |
| D924,912 | S | 7/2021 | Broughton et al. |
| D925,564 | S | 7/2021 | Zhao et al. |
| D926,214 | S | 7/2021 | Chuang et al. |
| 11,054,973 | B1 | 7/2021 | Manzari et al. |
| D928,190 | S | 8/2021 | Hartman et al. |
| D930,661 | S | 9/2021 | Broughton et al. |
| D933,709 | S | 10/2021 | Forsyth Spark |
| D938,980 | S | 12/2021 | Braica et al. |
| D941,324 | S | 1/2022 | Paul |
| D945,441 | S | 3/2022 | Yoon et al. |
| D945,453 | S | 3/2022 | Grecia |
| D947,243 | S | 3/2022 | Dye et al. |
| D948,569 | S | 4/2022 | Bennett et al. |
| D949,190 | S | 4/2022 | Broughton et al. |
| D951,296 | S | 5/2022 | Bennett et al. |
| D953,371 | S | 5/2022 | Schwabacher et al. |
| D954,738 | S | 6/2022 | Smith |
| D959,482 | S | 8/2022 | Song et al. |
| 11,425,892 | B1 | 8/2022 | Bennett et al. |
| D976,282 | S | 1/2023 | Hunt et al. |
| D976,952 | S | 1/2023 | Koo et al. |
| D976,953 | S | 1/2023 | Lim et al. |
| D986,921 | S | 5/2023 | Kanazawa et al. |
| D988,348 | S | 6/2023 | Watanabe |
| 11,880,227 | B1 * | 1/2024 | Mowry ............... G06F 16/583 |
| 2002/0116390 | A1 | 8/2002 | Meadows |
| 2013/0273969 | A1 | 10/2013 | Polimeno |
| 2014/0007017 | A1 | 1/2014 | Sternfeld et al. |
| 2014/0026088 | A1 | 1/2014 | Monte |
| 2015/0073907 | A1 | 3/2015 | Purves et al. |
| 2015/0078626 | A1 | 3/2015 | Kinard |
| 2016/0062639 | A1 | 3/2016 | Hwang et al. |
| 2016/0110383 | A1 | 4/2016 | Mowry |
| 2016/0171011 | A1 | 6/2016 | Drogobetski et al. |
| 2016/0259970 | A1 * | 9/2016 | Wee .................... A61B 5/0077 |
| 2016/0294894 | A1 | 10/2016 | Miller |
| 2016/0350953 | A1 | 12/2016 | Mittelstaedt et al. |
| 2017/0359690 | A1 | 12/2017 | Crutchfield et al. |
| 2017/0366661 | A1 | 12/2017 | Macklin |
| 2018/0025309 | A1 | 1/2018 | Absher et al. |
| 2018/0050769 | A1 * | 2/2018 | Robinson ............... B63B 32/10 |
| 2018/0157669 | A1 | 6/2018 | Naghdy et al. |
| 2018/0247274 | A1 | 8/2018 | Lipendin |
| 2018/0262877 | A1 | 9/2018 | Imes |
| 2018/0310119 | A1 | 10/2018 | Hyun et al. |
| 2019/0228031 | A1 * | 7/2019 | Grundmann ........ G06F 16/5866 |
| 2019/0246238 | A1 | 8/2019 | Crutchfield et al. |
| 2019/0297252 | A1 * | 9/2019 | Choi ...................... G06V 40/10 |
| 2019/0370805 | A1 | 12/2019 | Van Os et al. |
| 2020/0236267 | A1 * | 7/2020 | Choi ...................... G06V 40/10 |
| 2021/0089763 | A1 | 3/2021 | Shamsi et al. |
| 2021/0409906 | A1 | 12/2021 | Ickovic |
| 2022/0148104 | A1 | 5/2022 | Shelomentseva |

FOREIGN PATENT DOCUMENTS

| | | | | | |
|---|---|---|---|---|---|
| JP | 2006-202049 | A | | 8/2006 | |
| JP | 2010-62956 | A | | 3/2010 | |
| JP | 2016-519941 | A | | 7/2016 | |
| KR | 20200041296 | A | * | 4/2020 | ........... G06K 9/3233 |
| KR | 10-2125633 | B1 | | 6/2020 | |
| KR | 20210013901 | A | * | 2/2021 | ............. G06V 40/10 |
| WO | 2016/104712 | A1 | | 6/2016 | |

OTHER PUBLICATIONS (Apr. 30, 2021) "Smart Snout LTD", located at https://www.facebook.com/smartsnout/photos/pb.100065002312337.-2207520000..8128904215945086/?type=3, visited on Sep. 9, 2022. (1 page).

(Feb. 6, 2017). "Dogs nose icon", located at https://depositphotos.com/140814636/stock-illustration-dogs-nose-icon-logo-element.html, visited on Sep. 9, 2022. (2 pages).

(Feb. 7, 2021). "Vector flat dig nose isolated on white background" located at https://depositphotos.com/448683186/stock-illustration-vector-flat-dig-nose-isolated.html, visited on Sep. 9, 2022. (2 pages).

Brandt et al., U.S. Office Action dated Oct. 2, 2023, directed to U.S. Appl. No. 29/773,777; 12 pages.

Colbert (Apr. 28, 2019). "How to Draw a Dog's Nose" located at https://www.youtube.com/watch?v=TurZ-ISmYfM, visited on Sep. 12, 2022. (1 page).

Davilla (2020). "French Bulldogs" Dribbble located at https://dribbble.com/shots/14231364-French-Bulldogs visited on Sep. 10, 2022; 1 page.

International Preliminary Report on Patentability issued Jun. 13, 2023, directed to International Application No. PCT/US2021/072887; 6 pages.

International Search Report and Written Opinion mailed Apr. 5, 2022, directed to International Application No. PCT/US2021/072887; 12 pages.

Lago (2019). "Pedigree DentaStix Studios" located at https://www.behance.net/gallery/83589773/Pedigree-DentaStix-Studios visited on Sep. 9, 2022; 5 pages.

(56)            References Cited

OTHER PUBLICATIONS

Sandeep (Aug. 2018). "Profile Screen" retrieved from https://dribbble. com/shots/5060966-Profile-Screen visited May 5, 2022. (2 pages).
Widyastuti et al. "Cat's Nose Recognition Using You Only Look Once (Yolo)and Scale-Invariant Feature Transform (SIFT)," 2018 IEEE 7th Global Conference on Consumer Electronics (GCCE), Oct. 9-12, 2018, Nara, Japan; pp. 55-56.

* cited by examiner

202

204

204

208

206

SYSTEMS AND METHODS FOR NOSE-BASED PET IDENTIFICATION

CROSS-REFERENCE TO RELATED APPLICATIONS

This application is a U.S. national stage application under 35 U.S.C. § 371 of International Application No. PCT/US2021/072887, filed Dec. 13, 2021, which claims the priority of U.S. Provisional Application No. 63/125,929, filed on Dec. 15, 2020, the entire contents of each priority application is incorporated herein by reference.

FIELD OF THE DISCLOSURE

This disclosure related generally to pet identification, and in particular to pet identification via image recognition.

BACKGROUND OF THE DISCLOSURE

Current method for lost dog identification include the cumbersome and inconvenient methods of microchipping or dog tags. Both of these methods include significant barriers to register and identify a pet. Microchipping requires trips to a vet and dog tags often require the involvement of a government agency. Further, there can be some concern regarding safety for the pet involved in microchipping and dog tags can become lost.

SUMMARY OF THE DISCLOSURE

According to various embodiments, users can identify a pet using images of the pet's nose. A user can capture an image of the nose of a pet and the image can be analyzed to determine features of the nose that are distinctive for the pet. A database of registered pets that store representations of the features of the noses of the registered pets can be queried to determine the identity of a pet. According to various embodiments, a user need only a mobile device running a nose identification App to register a pet, in the case of an owner, or identify a pet, in the case of a pet service provide or lost pet finder. Thus, pet identification can be achieved with significantly fewer barriers than conventional microchipping and dog tagging.

According to various embodiments, a method for identifying a pet via an image of a nose of the pet includes receiving at least one image comprising the nose of the pet, identifying the nose of the pet and nostrils of the nose in the at least one image, comparing a degree of alignment of the nostrils of the nose with a first threshold value, in accordance with the degree of alignment of the nostrils meeting the threshold value, determining a quality metric for at least a nose portion of the image, and in accordance with the quality meeting a second threshold value, determining a representation of features of the nose of the pet in the at least one image.

In any of these embodiments, identifying the nose of the pet and nostrils of the nose in the at least one image can include using a machine learning algorithm.

In any of these embodiments, comparing a degree of alignment of the nostrils of the nose with a first threshold value can include determining a horizontal alignment of the nostrils by determining a vertical offset between the nostrils.

In any of these embodiments, the first threshold value can be 30 degrees.

In any of these embodiments, the method can further include, prior to determining the representation of features of the nose of the pet in the at least one image, comparing a size of one nostril to the other.

In any of these embodiments, the quality metric can be a blur metric. Optionally, the blur metric is determined using singular value decomposition.

In any of these embodiments, the representation of features of the nose of the pet can be determined via a local binary patterns histogram algorithm.

In any of these embodiments, the method may further include comparing the representation of features of the nose of the pet with a plurality of stored representations of features of noses of pets corresponding to stored pet identities to identify the pet.

According to various embodiments, a system includes one or more processors, memory, and one or more programs stored in the memory and comprising instructions for execution by the one or more processors for performing any of the above methods.

According to various embodiments, a non-transitory computer readable storage medium stores one or more programs for execution by one or more processors for performing any of the above methods.

BRIEF DESCRIPTION OF THE FIGURES

The invention will now be described, by way of example only, with reference to the accompanying drawings, in which.

DETAILED DESCRIPTION OF THE DISCLOSURE

Figure 1:
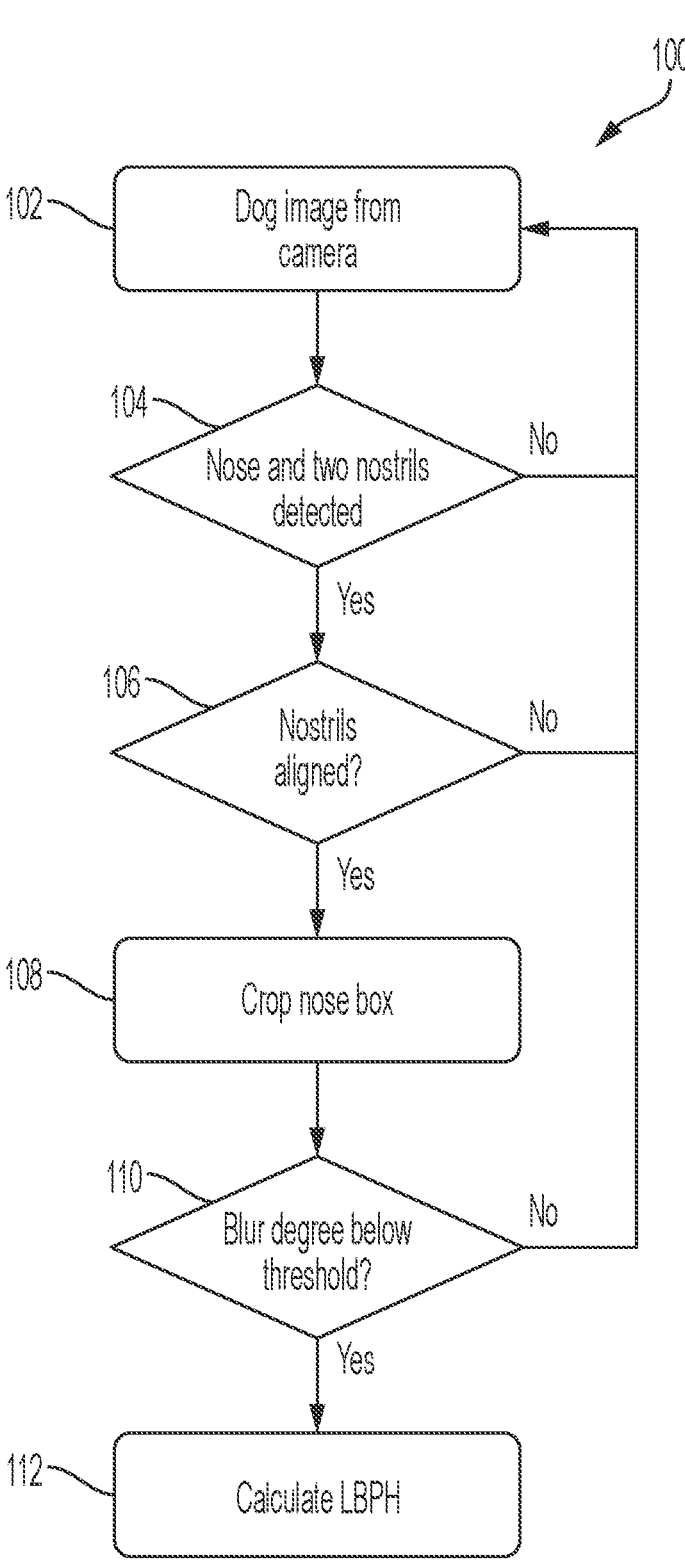
FIG. 1 illustrates a method for pet identification using image recognition, according to various embodiments.

Systems and methods, according to various embodiments, enable the identification of pets via image recognition of on images of pet noses. According to various embodiments, an image of at least a portion of a face of a pet, such as a dog or cat, is captured and analyzed to detect the nose of the pet in the image. The nose portion is analyzed and converted to a representation of features of at least a portion of the nose is stored in a database along with identifying information for the pet. Subsequently captured images of the pet can be analyzed in similar fashion and compared to the stored representation to identify the pet.

According to various embodiments, a mobile application on a user mobile device may enable a user to capture an image of a face of a pet and upload the image or a representation of the image to a server that stores the representation of the image in a pet identification database. A pet owner may provide identifying information along with an image of their pet, such as during a registration process. A finder of a lost pet may use the mobile application to capture an image of a lost pet for identifying the lost pet. According to some embodiments, upon matching an image captured by a finder of a lost pet with a representation of an image in the pet identification databased, the server may provide an alert to a pet owner that their pet has been found. The systems and methods described herein enable lost pets to be reunited with their owners without requiring veterinary visits and surgery, as required with microchipping, and without requiring tags that can be damaged or mistakenly left off of the pet.

In some embodiments, the systems and methods described herein enable storing of pet related activities, such as veterinary visits, in associated with pet identities for tracking the health or other aspects of the pet over the pet's lifetime. A veterinary office, groomer, or other pet service provider, can capture an image of a pet when checking the pet in for an appointment. The pet can be automatically identified and records generated during a previous appointment can be accessed for reference by the provider and/or records generated during the appointment can be associated with the pet for future access by the provider or a different provider.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates a method 100 for pet identification using image recognition performed on an image of distinctive anatomy of the pet. According to various embodiments, method 100 can be used to identify a pet, such as a dog or cat, from an image of the nose of the pet. The description below refers to identification of a dog, but it is to be understood that the principles described below could be applied to identification of other animals, such as a cat, and that such application is within the scope of this disclosure.

At step 102, an image of a face dog is captured, such as using the camera of a mobile device. The image can be captured using an App running on the mobile device, which may guide a user to capture at least one image the nose of the dog. In some embodiments, the App controls the mobile device to ensure that the flash is on during image capture so that the dog nose is adequately illuminated.

At step 104, the image is analyzed to detect the nose in the image and to detect the nostrils in the image. In some embodiment, the nose and/or nostrils are detected using a machine learning algorithm, such as the Google™ AutoML Object Detection model. In some embodiments, the machine learning algorithm is trained on images of dog noses and/or nostrils. In some embodiments, the machine learning algorithm is trained on images of dog noses and/or nostrils that are labeled and include bounding boxes for the nose and/or nostrils. In some embodiments, the machine learning algorithm determines a bounding box of the nose. According to various embodiments, if the nose and/or nostrils cannot be detected, then method 100 may return to step 102 for the capture of another image. The user may be prompted, for example, to capture another image.

Figure 8:
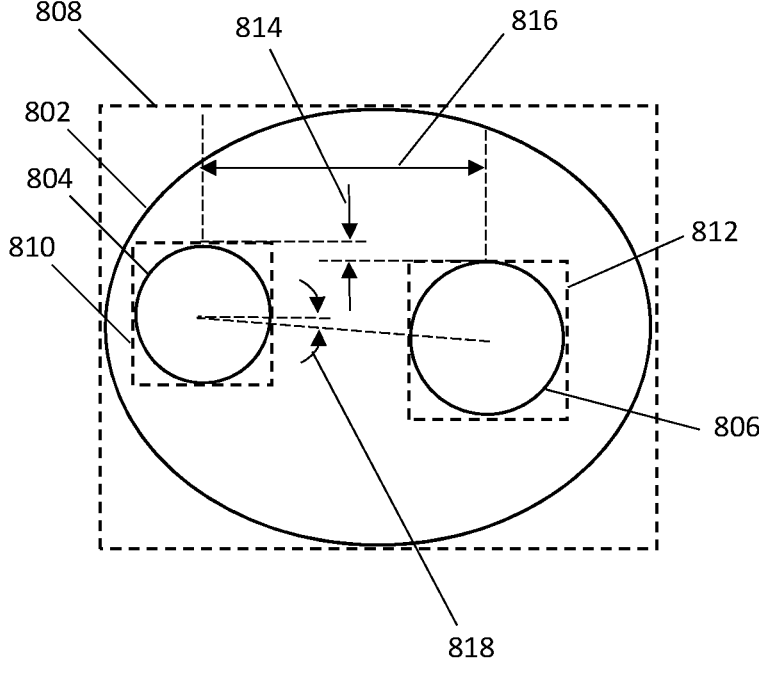
FIG. 8 illustrates an example of measurements used to determine alignment of nostrils.

At step 106, if the nose and nostrils have been detected, then the nostrils are analyzed to determine the alignment of the nostrils in the image. In some embodiments, a vertical distance between top edges or centers of the detected nostrils may be measured and used along with a horizontal spacing between the measurement points to determine the alignment of the nostrils. An example of this is shown in FIG. 8, which includes a schematic representation of an exemplary nose 802 having nostrils 804 and 806. A machine learning model has determined a bounding box 808 for the nose 802, a bounding box 810 for nostril 804, and a bounding box 812 for nostril 806. A vertical measurement 814 may be taken between the tops of the bounding boxes 810, 812, which may correspond with the tops of the nostrils 804, 806, and a horizontal measurement 816 may be taken between the horizontal centers of the bounding boxes 810, 812. One or both of these measurements may be used to determine alignment of the nostrils. In some embodiments, the determined alignment may be compared to an alignment threshold value to determine whether the nostrils are adequately aligned in the image. Examples of alignment thresholds include 30 degrees or less, 25 degrees or less, 20 degrees or less, 15 degrees or less, 5 degrees or less, 2 degrees or less, and 1 degree or less, with the angle taken between a line connecting an estimate of the nostril top edges or centers and a horizontal line across the image. FIG. 8 illustrates an exemplary angular measurement 818 that may be determined from the horizontal and vertical spacing of the nostrils, as discussed above. If the nostrils are not adequately aligned, then the method returns to step 102 for the capture of a new image. In some embodiments, the alignment of the nostrils may be used to rotate the image instead of or in addition to accepting or rejecting the image. For example, if the determined alignment is 5 degrees from horizontal, then the image may be rotated by 5 degrees.

In some embodiments, the sizes of the nostrils may be compared and a measure of the difference between the sizes of the nostrils may be compared to a threshold value. Nostrils that are too dissimilar in size may indicate that the nose is turned to far to one side in the image or that the light comes too strongly from one side, either of which may provide poor performance. For example, with respect to FIG. 8, the size of nostril 804 may be determined to be less than the size of the nostril 806 based on the sizes of the respective bounding boxes 810, 812. Images having nostrils that are too dissimilar in size (for example, failing to meet a predetermined threshold size difference) may be rejected and the method may return to step 102 for the capture of a new image. In some embodiments, guidance may be provided to the user regarding how to improve the next image capture.

At step 108, if the nostrils are adequately aligned and/or after rotating the image according to the alignment, the image may be cropped to include primarily the nose-portion. At least some of any non-nose portion of the image may be removed, such as by removing portions outside of the bounding box of the nose determined at step 104. In some embodiments, the image is down-sampled to reduce the amount of data and processing time. In some embodiments, the image is converted to a gray-scale image (in some embodiments, the image is converted to a gray-scale image prior to or during any one of steps 104-106).

At step 110, the cropped image is analyzed to determine an image quality metric for the image. In some embodiments, the image quality metric is a degree of blur. The image blur can be determined using any suitable blur analysis technique or combination of techniques, such as Variance of Laplacian, Cumulative Probability of Blur Detection (CPBD), Structural Similarity (SSIM), and Haar Wavelet. In some embodiments, a singular value decomposition (SVD) method is used to calculate a blur degree number, which is then compared to a threshold. According to various embodiments, if the blur degree number (or other image quality metric) fails to meet the threshold requirement, the image is rejected and the method returns to step 102 for capturing a new image.

Figure 2A:
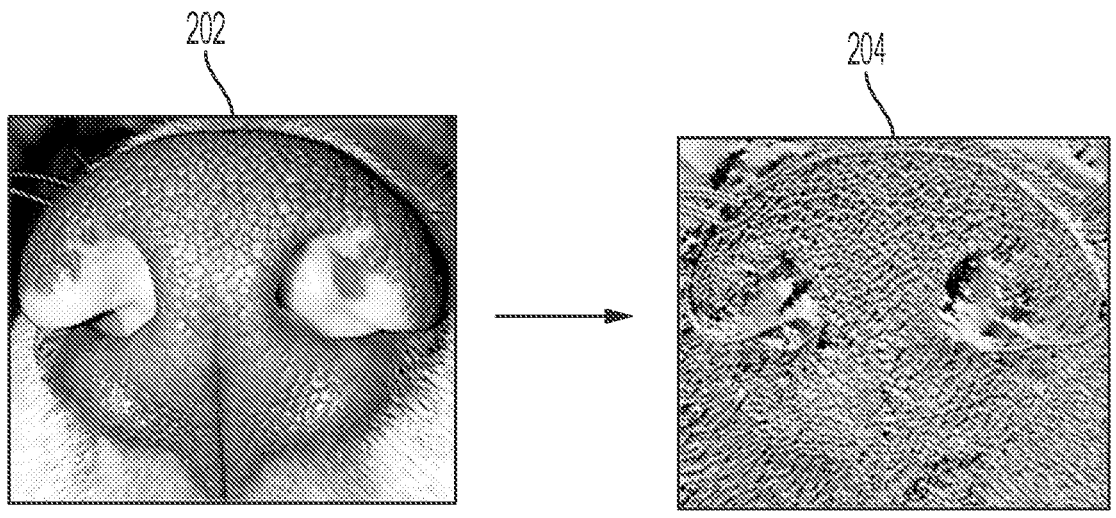
FIGS. 2A and 2B illustrate a technique for extracting features of a nose of a pet, according to various embodiments.
Figure 2B:
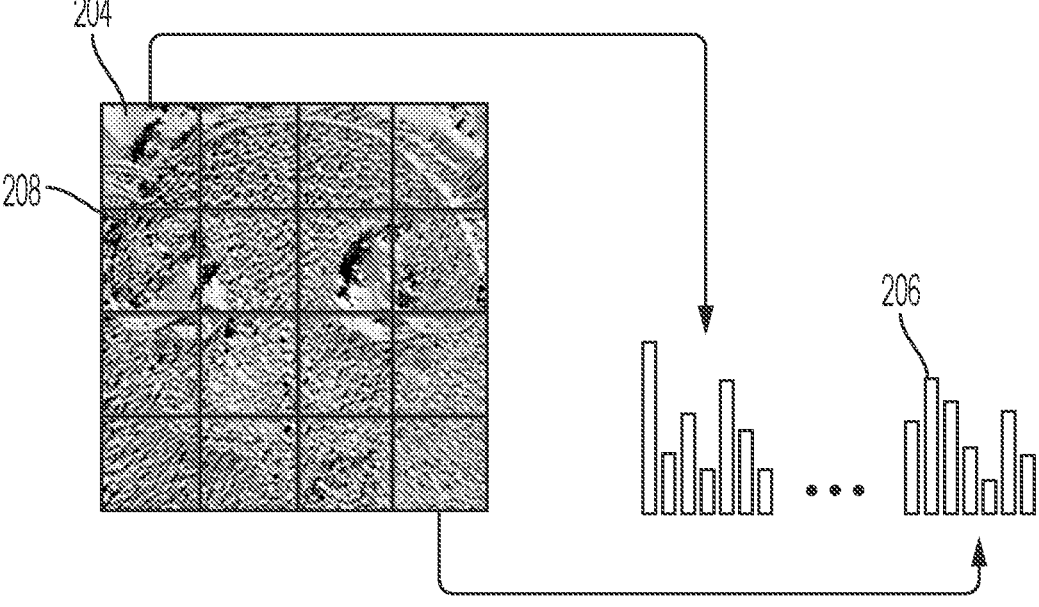

At step 112, if the image meets the image quality threshold (e.g., blur degree) requirement of step 110, then the image (or cropped portion of the image) is analyzed to extract the distinctive features of the nose of the pet and generate a representation of the features of the nose in the image that will be relatively invariant from one image of the nose to the next such that two images of the same nose taken at different times and in different conditions will produce the same or substantially the same representation. In some embodiments, a Local Binary Patterns Histogram (LBPH) technique is used to generate the representation of the features of the nose in the image. According to some embodiments, the LBPH technique includes dividing the cropped image into a grid (e.g., with 8×8 cells), calculating the LBP for each cell, and then calculating the histogram of that LBP. FIGS. 2A and 2B illustrate the LBPH technique for extracting the features of the nose of a pet, according to various embodiments. FIG. 2A illustrates the generation of an LBP representation 204 of the cropped image 202. FIG. 2B illustrates the calculation of a histogram 206 for each cell of a grid 208 of the LBP representation 204. The LBPH used in step 112 is merely an example of a method for generating a representation of the features of the nose. Another example is perceptual hashing.

In some embodiments, a user may be guided to capture a plurality of images of the nose of the pet and method 100 may be performed on the images after all have been captured. In some embodiments, a subsequent image is captured only if an image fails to meet one or more image quality thresholds of method 100. In some embodiments, method 100 is performed on each of a plurality of images and the image that has the best quality metrics may be selected for generating the representation of the features of the nose in step 112.

Figure 3:
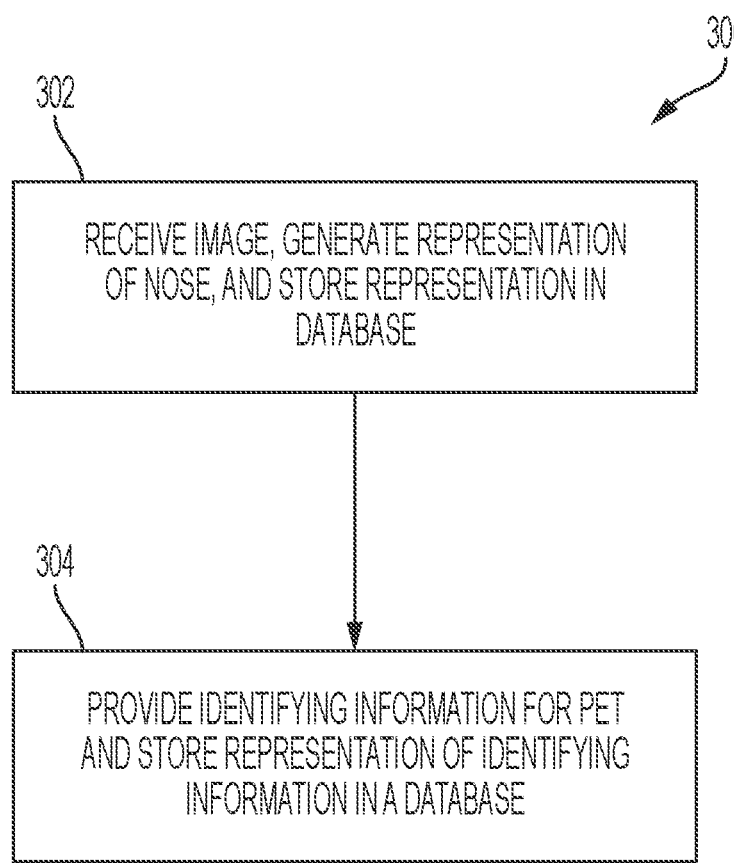
FIG. 3 illustrates a method for registering a pet using a nose-recognition based pet identification method, according to various embodiments.

FIG. 3 illustrates a method 300 for registering a pet using a nose-recognition based pet identification method, such as method 100 of FIG. 1. At step 302, one or more images of a nose of a pet are received and used to generate a representation of features of the nose, such as using method 100 of FIG. 1. The images may be captured by a mobile device, such as the mobile device of an owner of the pet, and received by an App running on the mobile device and/or may be received by a server that is communicatively connected to a mobile device that captures the image(s). In some embodiments, the App may guide the user through an image capture process. One or more steps of method 100 for generating the representation of the features of the nose of the pet may be performed on a server connected to the mobile device. For example, an image captured by the mobile device may be uploaded to the server and the server may perform steps 104-112. In some embodiments, one or more steps of method 100 are performed locally on the mobile device. In some embodiments, all steps of method 100 are performed on the device and the representation of the features of the nose of the pet generated by the mobile device (e.g., App running on the mobile device) is uploaded to a server. The representation of the features of the nose are stored in a pet identification database on the server.

At step 304, identifying information for the pet is received, such as at the mobile device of the pet owner and/or at a server. Examples of identifying information are: name of the pet, breed of the pet, sex of the pet, physical characteristics of the pet (weight, height, color, etc.), name of the pet owner, phone number of the pet owner, address of pet owner, etc. The identifying information may be entered into an App running on the mobile device via one or more fields of a graphical user interface. The identifying information is uploaded to the server and stored in the database on the server in association with the representation of the features of the nose of the pet.

Figure 4:
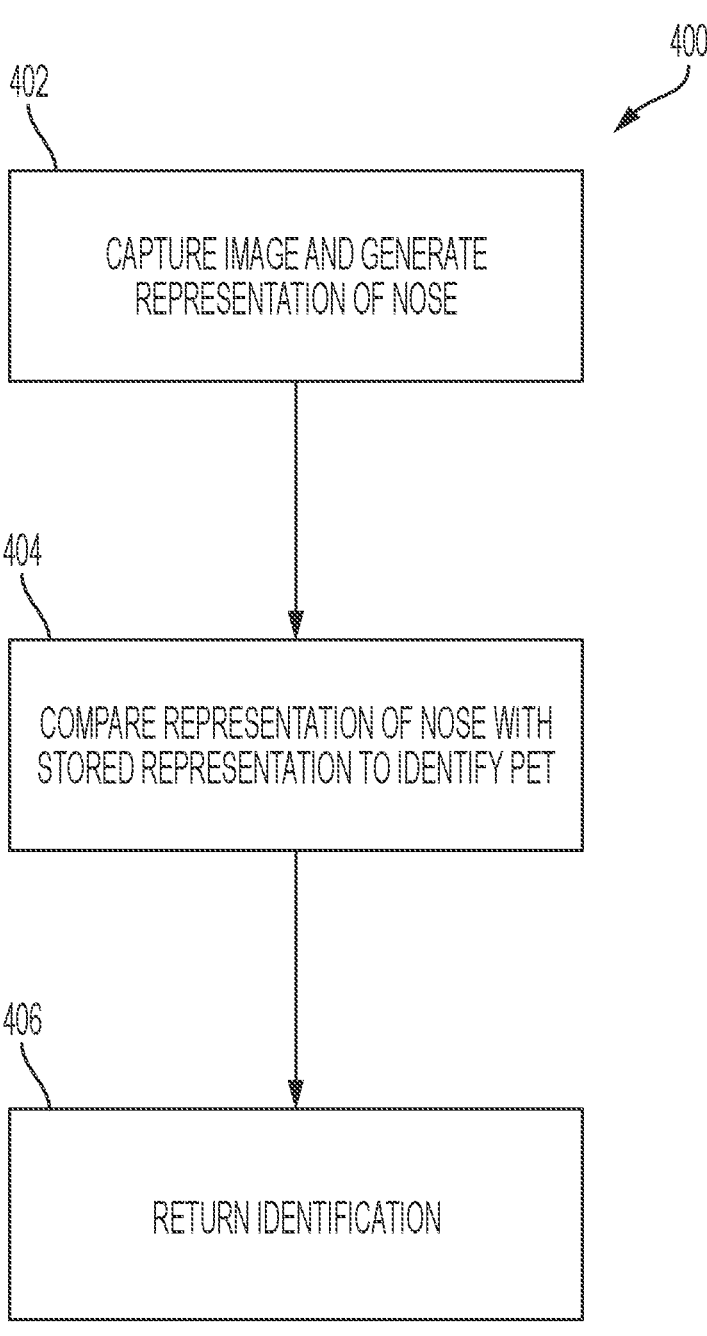
FIG. 4 illustrates a method for identifying a pet via a nose recognition method, according to various embodiments.

FIG. 4 illustrates a method for identifying a pet via the nose recognition method 100 of FIG. 1. At step 402, one or more images of a nose of a pet are captured at a mobile device. The mobile device may belong to someone who found a pet that appeared to be lost and the mobile device owner may use a lost pet identification feature of an App running on their mobile device to try to identify the pet, or the mobile device could be a mobile device of a veterinary practice or other pet service that is checking in the pet for an appointment. The one or more images of the nose of the pet are analyzed according to method 100 of FIG. 1 and a representation of the features of the nose is generated. The representation of the features of the nose may be uploaded to a server communicatively connected to the mobile device or the server may generate the representation of the features of the nose from images captured by the mobile device.

At step 404, the representation of the features of the nose generated at step 402 are compared with a database of stored representations corresponding to registered pets to determine whether the representation matches any stored representations. In some embodiments, matching can be determined by calculating a similarity score between the representation of the features of the nose generated at step 402 and a respective representation in the database, and the similarity score can be compared to a threshold value. Various techniques for comparing the LBPH of step 112 of method 100 include Euclidean distance, chi-square, and absolute value. Upon achieving a match, the identifying information for the stored representation is retrieved from the database.

At step 406, upon achieving a successful match in step 404, an indication of the identification of the pet may be provided. In some embodiments, the indication is provided to the mobile device that initiated the identification process, such as the lost pet finder or the pet service provider. In some embodiments, an indication that a lost pet has been found may be provided to the mobile device of the pet owner along with some indication of the location of the pet, such as GPS or map location of the pet based on the location of the mobile device of the pet finder or location information provided by the pet finder (e.g., manually entered by the pet finder into the App). In some embodiments, information regarding the lost pet finder may be provided to the pet owner, such as a phone number. In some embodiments, the App on the mobile device of the pet owner and pet finder may enable communication between the pet owner and pet finder.

Figure 5A:
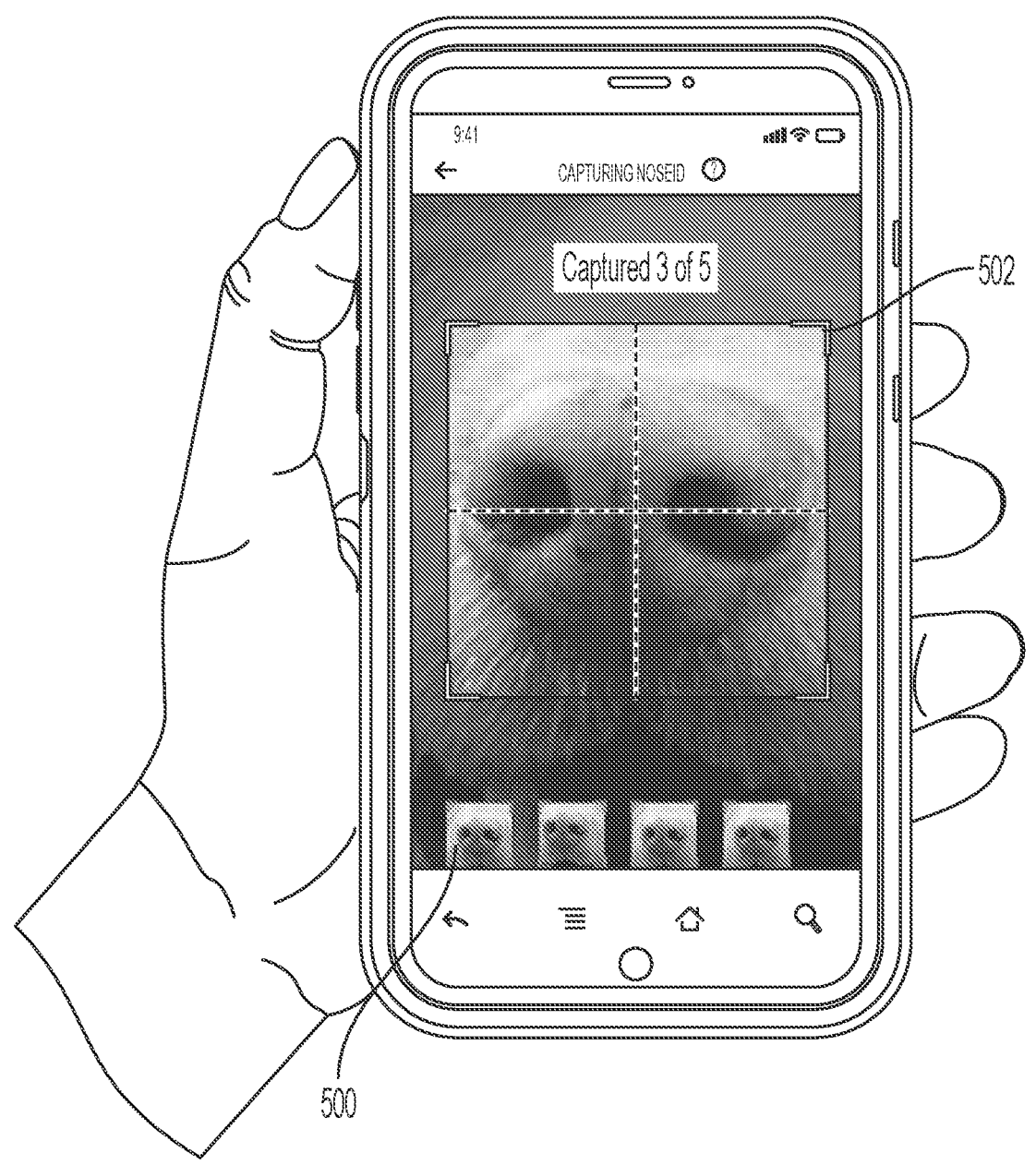
FIGS. 5A and 5B illustrate a graphical user interface for capturing one or more images of a nose of a dog for identification and identifying information, according to various embodiments.
Figure 5B:
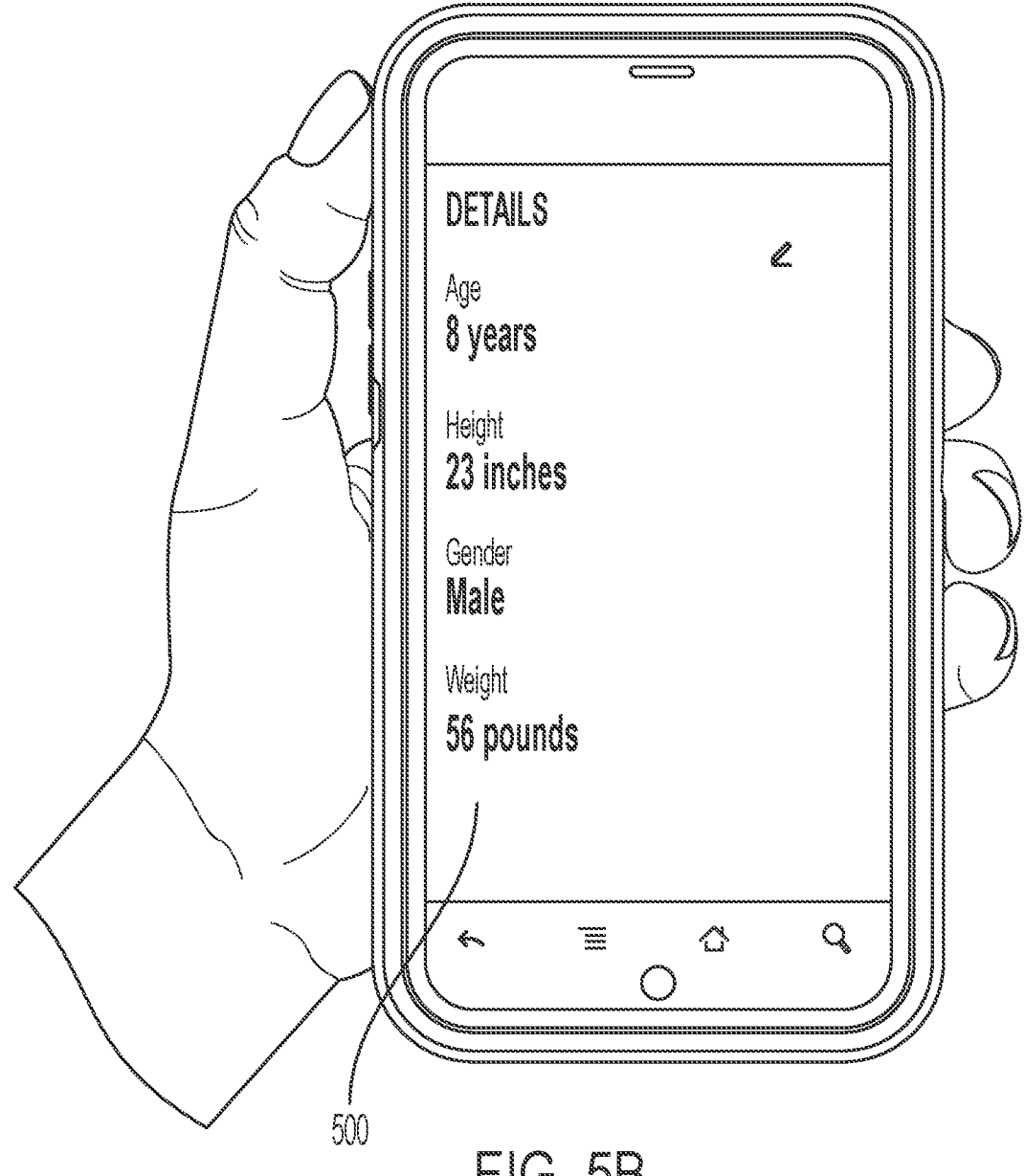

FIG. 5A illustrates a graphical user interface 500 for capturing one or more images of a nose of a dog for use in method 100 of FIG. 1. A target box 502 may be provided to guide the user regarding how to capture an image of the nose of the dog. FIG. 5B illustrates pet identifying information that may be provided via the user interface 500.

Figure 6:
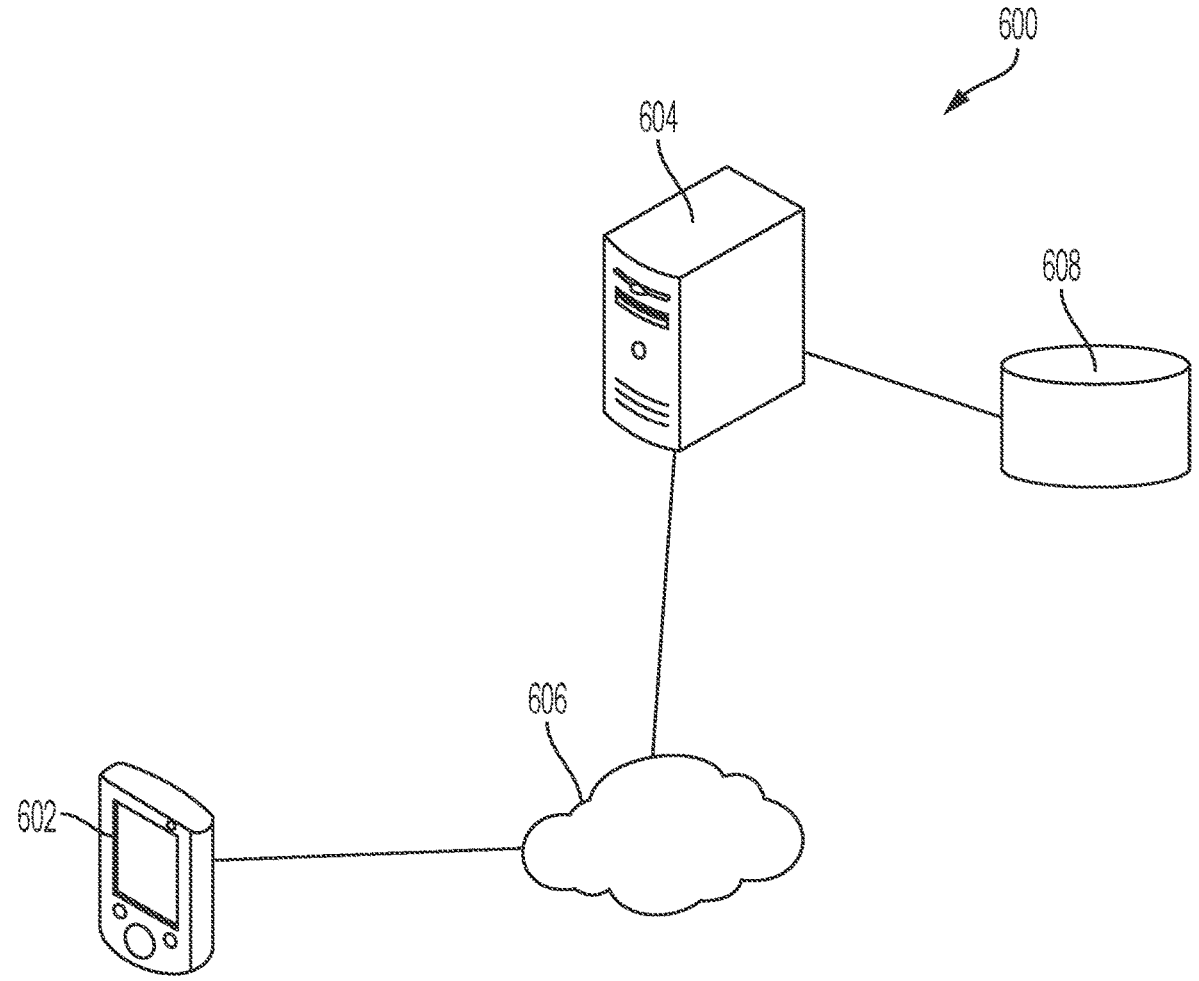
FIG. 6 illustrates a system for pet identification, according to various embodiments.

FIG. 6 illustrates a system 600 for pet identification, according to various embodiments. One or more mobile devices 602 can be used to capture images of a nose of a pet. The images or results of one or more steps of image processing performed by the mobile device 602 can be transmitted to a server 604 connected to the mobile device 602 via one or more networks 606. The server 604 is connected to a database 608 for storing a representation of the features of a nose of a pet along with identifying information. The server 604 may query the database 608 to search for a match to a representation of features of a nose of a pet for identifying the pet, according to the principles discussed above.

Figure 7:
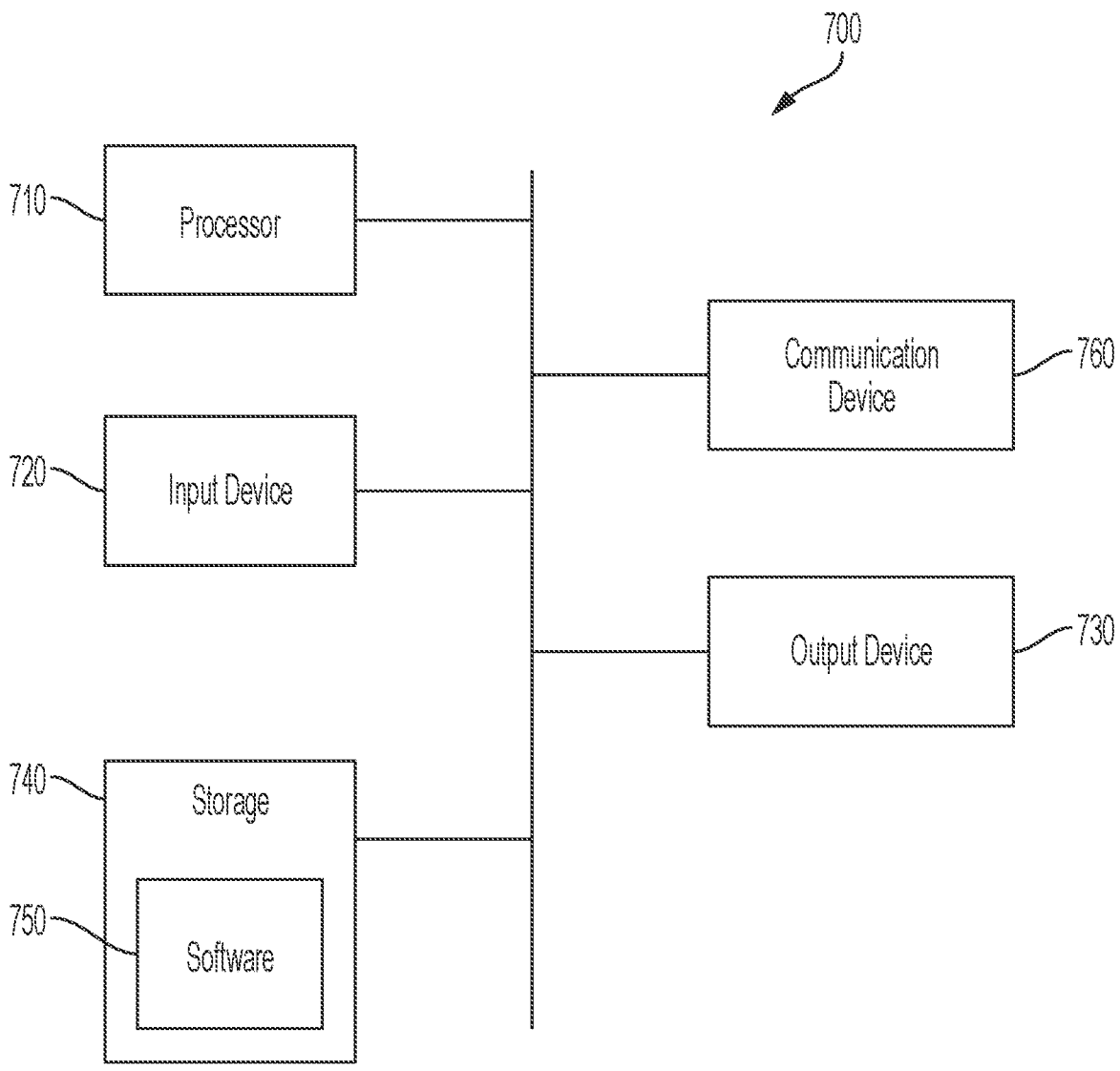
FIG. 7 illustrates an example of a computing system, according to some embodiments.

FIG. 7 illustrates an example of a computing system 700, in accordance with some embodiments, that can be used for one or more of components of system 600 of FIG. 6, such mobile device 602 or server 604. System 600 can be a computer connected to a network, such as a local area network, a wide area network, a cellular network, etc. System 600 can be a client or a server. As shown in FIG. 7, system 700 can be any suitable type of processor-based system, such as a personal computer, workstation, server, handheld computing device (portable electronic device) such as a phone or tablet, or dedicated device. The system 700 can include, for example, one or more of input device 720, output device 730, one or more processors 710, storage 740, and communication device 760. Input device 720 and output device 730 can generally correspond to those described above and can either be connectable or integrated with the computer.

Input device 720 can be any suitable device that provides input, such as a touch screen, keyboard or keypad, mouse, gesture recognition component of a virtual/augmented reality system, or voice-recognition device. Output device 730 can be or include any suitable device that provides output, such as a display, touch screen, haptics device, virtual/augmented reality display, or speaker.

Storage 740 can be any suitable device that provides storage, such as an electrical, magnetic, or optical memory including a RAM, cache, hard drive, removable storage disk, or other non-transitory computer readable medium. Communication device 760 can include any suitable device capable of transmitting and receiving signals over a network, such as a network interface chip or device. The components of the computing system 700 can be connected in any suitable manner, such as via a physical bus or wirelessly.

Processor(s) 710 can be any suitable processor or combination of processors, including any of, or any combination of, a central processing unit (CPU), field programmable gate array (FPGA), and application-specific integrated circuit (ASIC). Software 750, which can be stored in storage 740 and executed by one or more processors 710, can include, for example, the programming that embodies the functionality or portions of the functionality of the present disclosure (e.g., as embodied in the devices as described above). For example, software 750 can include one or more programs for performing one or more of the steps of method 400, method 800, and/or method 1000.

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for identifying a pet via an image of a nose of the pet comprising, at a computing system:
   receiving at least one image comprising the nose of the pet;
   identifying the nose of the pet and nostrils of the nose in the at least one image;
   comparing a degree of alignment of the nostrils of the nose with a first threshold value, wherein comparing the degree of alignment of the nostrils of the nose with the first threshold value comprises determining a horizontal alignment of the nostrils by determining a vertical offset between the nostrils;
   in accordance with the degree of alignment of the nostrils meeting the first threshold value, determining a quality metric for at least a nose portion of the image; and
   in accordance with the quality metric meeting a second threshold value, determining a representation of features of the nose of the pet in the at least one image.

2. The method of claim 1, wherein identifying the nose of the pet and the nostrils of the nose in the at least one image comprises using a machine learning algorithm.

3. The method of claim 1, wherein the first threshold value is 30 degrees.

4. The method of claim 1, further comprising, prior to determining the representation of features of the nose of the pet in the at least one image, comparing a size of one nostril to the other.

5. The method of claim 1, wherein the quality metric is a blur metric.

6. The method of claim 5, wherein the blur metric is determined using singular value decomposition.

7. The method of claim 1, wherein the representation of features of the nose of the pet is determined via a local binary patterns histogram algorithm.

8. The method of claim 1, further comprising comparing the representation of features of the nose of the pet with a plurality of stored representations of features of noses of pets corresponding to stored pet identities to identify the pet.

9. A system comprising one or more processors, memory, and one or more programs stored in the memory and including instructions for execution by the one or more processors for
   receiving at least one image comprising a nose of a pet;
   identifying the nose of the pet and nostrils of the nose in the at least one image;
   comparing a degree of alignment of the nostrils of the nose with a first threshold value, wherein comparing the degree of alignment of the nostrils of the nose with the first threshold value comprises determining a horizontal alignment of the nostrils by determining a vertical offset between the nostrils;
   in accordance with the degree of alignment of the nostrils meeting the first threshold value, determining a quality metric for at least a nose portion of the at least one image; and
   in accordance with the quality metric meeting a second threshold value, determining a representation of features of the nose of the pet in the at least one image.

10. The system of claim 9, wherein identifying the nose of the pet and the nostrils of the nose in the at least one image comprises using a machine learning algorithm.

11. The system of claim 9, wherein the first threshold value is 30 degrees.

12. The system of claim 9, wherein the one or more programs include further instructions for, prior to determining the representation of features of the nose of the pet in the at least one image, comparing a size of one nostril to the other.

13. The system of claim 9, wherein the quality metric is a blur metric.

14. The system of claim 13, wherein the blur metric is determined using singular value decomposition.

15. The system of claim 9, wherein the representation of features of the nose of the pet is determined via a local binary patterns histogram algorithm.

16. The system of claim 9, wherein the one or more programs include further instructions for comparing the representation of features of the nose of the pet with a plurality of stored representations of features of noses of pets corresponding to stored pet identities to identify the pet.

17. A non-transitory computer readable storage medium storing one or more programs for execution by one or more processors of a computing system for causing the computing system to:
   receive at least one image comprising a nose of a pet;
   identify the nose of the pet and nostrils of the nose in the at least one image;
   compare a degree of alignment of the nostrils of the nose with a first threshold value, wherein comparing the degree of alignment of the nostrils of the nose with the first threshold value comprises determining a horizontal alignment of the nostrils by determining a vertical offset between the nostrils;

in accordance with the degree of alignment of the nostrils meeting the first threshold value, determine a quality metric for at least a nose portion of the at least one image; and in accordance with the quality metric meeting a second threshold value, determine a representation of features of the nose of the pet in the at least one image.

* * * * *